United States Patent
Adrian

(10) Patent No.: US 10,861,502 B2
(45) Date of Patent: Dec. 8, 2020

(54) APPARATUS, SYSTEM, AND METHOD FOR PREVENTING SHOCK-INDUCED HARD DRIVE DAMAGE

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/854,743

(22) Filed: Dec. 26, 2017

(65) Prior Publication Data

US 2019/0198060 A1 Jun. 27, 2019

(51) Int. Cl.
*G11B 33/10* (2006.01)
*G11B 5/55* (2006.01)
*G06F 12/0866* (2016.01)

(52) U.S. Cl.
CPC ............ *G11B 33/10* (2013.01); *G11B 5/5582* (2013.01); *G06F 12/0866* (2013.01); *G06F 2212/1032* (2013.01); *G06F 2212/21* (2013.01); *G06F 2212/281* (2013.01)

(58) Field of Classification Search
CPC .................................. G11B 33/10; G11B 5/55
USPC .............. 369/103; 361/724; 360/75; 711/112
See application file for complete search history.

(56) References Cited

U.S. PATENT DOCUMENTS

| | | | |
|---|---|---|---|
| 2003/0002261 A1* | 1/2003 | Berry | H05K 7/1489 361/727 |
| 2006/0010458 A1* | 1/2006 | Georgis | G11B 33/122 720/600 |
| 2006/0067060 A1* | 3/2006 | Zimlin | H05K 7/1495 361/724 |
| 2008/0253015 A1* | 10/2008 | Harrington | G11B 19/042 360/75 |
| 2011/0235493 A1* | 9/2011 | Sun | G11B 7/0065 369/103 |
| 2016/0047160 A1* | 2/2016 | Huynh | E05F 15/63 49/31 |

OTHER PUBLICATIONS

ThinkPad Z61e,Z61m, and Z61p Hardware Maintenance Manual. Jan. 2007.*

* cited by examiner

*Primary Examiner* — Mano Padmanabhan
*Assistant Examiner* — John Francis Wojton
(74) *Attorney, Agent, or Firm* — FisherBroyles, LLP

(57) ABSTRACT

A shack-sensor apparatus may include a sensor configured to detect a positional state of a hard-drive drawer. The shock-sensor apparatus may also include a mounting component coupled to the sensor and configured to mount the sensor in a location to monitor the positional state of the hard-drive drawer. In addition, the shock-sensor apparatus may include a computing module, electronically coupled to the sensor, that analyzes sensor data provided by the sensor to predict a shock event of the hard-drive drawer and send, in response to predicting the shock event, a signal to at least one hard drive in the hard-drive drawer to prevent damage to the hard drive. Various other apparatuses, systems, and methods are also disclosed.

20 Claims, 5 Drawing Sheets

APPARATUS, SYSTEM, AND METHOD FOR PREVENTING SHOCK-INDUCED HARD DRIVE DAMAGE

BACKGROUND

Data centers and server farms often use a multitude of hard drives to increase storage and computational power and capabilities. These hard drives are sometimes stored in a way that enables administrators to easily install, remove, or swap the drives to change configurations or to upgrade or service equipment. For example, multiple hard drives may be stored within a single carrier or drawer that enables administrators to easily remove and service such hardware. However, configurations like these may subject hard drives to excessive shock events that can damage and/or negatively impact the performance of the drives. For example, when a rack drawer is opened or closed, it may create a sudden change in the position of hard drives inside the drawer due to the drawer's acceleration or deceleration.

Unfortunately, hard drives may be damaged if their read/write heads accidentally impact their hard drive platters during an unexpected shock event like this. For example, the simple act of an administrator opening or closing a rack drawer may create enough shock to cause a drive's read/write head to impact the drive's platter, potentially damaging the same or causing the read/write head to pick up residue or debris that will wear down or damage the read/write head or platter over time. This problem is often exacerbated by modern storage techniques, which attempt to position the tip of a hard drive's read/write head as close as possible to the platter in order to improve performance.

SUMMARY

As will be described in greater detail below, the instant disclosure describes various apparatuses, systems, and methods for preventing shock-induced hard drive damage by using sensors to predict potential shock events that may negatively impact a hard drive and then sending signals or instructions to the hard drive to notify it of the same. In one example, a shock-sensor apparatus may include a sensor configured to detect a positional state of a hard-drive drawer. In this example, the shock-sensor apparatus may also include a mounting component coupled to the sensor and configured to mount the sensor in a location to monitor the positional state of the hard-drive drawer. Additionally, the shock-sensor apparatus may include a computing module, electronically coupled to the sensor, that analyzes sensor data provided by the sensor to predict a shock event of the hard-drive drawer and to send, in response to predicting the shock event, a signal to at least one hard drive in the hard-drive drawer to prevent damage to the hard drive.

In some embodiments, the above sensor may be configured to detect a relative location of the hard-drive drawer. Additionally or alternatively, the sensor may be configured to detect a relative velocity of the hard-drive drawer.

In some examples, the mounting component may mount the sensor to a side of the hard-drive drawer, a handle of the hard-drive drawer, and/or an extension rail of the hard-drive drawer. Additionally or alternatively, the mounting component may mount the sensor to a chassis dimensioned to hold the hard-drive drawer, a printed circuit board in the hard-drive drawer, and/or the hard drive in the hard-drive drawer.

In one embodiment, the computing module may be configured to predict the shock event of the hard-drive drawer based on the sensor data on the positional state of the hard-drive drawer.

In one example, the computing module may be electronically coupled to the hard drive in the hard-drive drawer such that the computing module sends the signal to the hard drive.

According to various embodiments, a corresponding hard-drive rack may include a rack dimensioned to hold computing hardware. The hard-drive rack may also include one or more chassis coupled to the rack and dimensioned to each hold a hard-drive drawer. Additionally, the hard-drive rack may include one or more hard drives dimensioned to removably fit in the hard-drive drawer. Furthermore, the hard-drive rack may include one or more shock-sensor apparatuses configured to detect a positional state of the hard-drive drawer, predict a shock event of the hard-drive drawer based on an analysis of the positional state of the hard-drive drawer, and send, in response to predicting the shock event, a signal to the hard drive in the hard-drive drawer to prevent damage to the hard drive.

In one example, the hard-drive drawer may be dimensioned to extend from the chassis on at least one extension rail.

In one embodiment, the hard drive may include a hard-drive disk configured to store digital data. The hard drive may also include a non-volatile memory cache configured to store additional digital data.

In some examples, the hard drive may be removably installed in the hard-drive drawer such that opening the hard-drive drawer exposes the hard drive. Alternatively, the hard drive may be installed such that the hard drive is loaded to a front of the hard-drive drawer.

In some embodiments, the hard drive may be coupled to a read/write head that performs read/write operations on the hard drive with a heating element. In these embodiments, the shock-sensor apparatus may be electronically coupled to the hard drive such that the shock-sensor apparatus sends the signal to adjust a behavior of the read/write head.

In one example, the shock-sensor apparatus of the above hard-drive rack may be mounted to a side of the hard-drive drawer, a handle of the hard-drive drawer, and/or an extension rail of the hard-drive drawer. Additionally or alternatively, the shock-sensor apparatus of the above hard-drive rack may be mounted to the chassis, a printed circuit board in the hard-drive drawer, and/or the hard drive in the hard-drive drawer.

In addition to the various systems and apparatuses described herein, the instant disclosure presents exemplary methods for preventing shock-induced hard drive damage. For example, a corresponding method may include detecting, by one or more shock-sensor apparatuses, a positional state of a hard-drive drawer. The method may also include predicting, by analyzing the positional state of the hard-drive drawer, a shock event of the hard-drive drawer. Furthermore, the method may include sending, based on the predicted shock event, a signal to one or more hard drives in the hard-drive drawer to prevent damage to the hard drive.

In one embodiment, a shock-sensor apparatus may include a sensor configured to detect the positional state of the hard-drive drawer and a mounting component coupled to the sensor and configured to mount the sensor to monitor the positional state of the hard-drive drawer. Additionally, the shock-sensor apparatus may include a computing module, electronically coupled to the sensor, that analyzes sensor data provided by the sensor.

In some examples, the detected positional state of the hard-drive drawer may include a relative location of the hard-drive drawer. Additionally or alternatively, the detected positional state may include a relative velocity of the hard-drive drawer.

In one example, predicting the shock event of the hard-drive drawer may include predicting a time of impact of the hard-drive drawer, an amount of shock caused by an impact to the hard-drive drawer, and/or a type of the shock event. In this example, sending the signal to the hard drive may include sending the signal within a minimum timeframe before the time of impact of the predicted shock event.

In some embodiments, sending the signal to the hard drive may include sending the signal to a read/write head that performs read/write operations on the hard drive with a heating element. In these embodiments, the signal may include a command to perform one or more of the following: delaying a read/write process during the shock event, preventing the read/write process during the shock event, adjusting a distance of the read/write head from the hard drive, temporarily writing data to a non-volatile memory cache, parking the read/write head during the shock event, and turning off the heating element of the read/write head during the shock event.

In some examples, the above method may further include detecting an end of the shock event and/or sending an additional signal to the hard drive in the hard-drive drawer. Additionally or alternatively, the above method may further include resuming a normal read/write operation on the hard drive.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
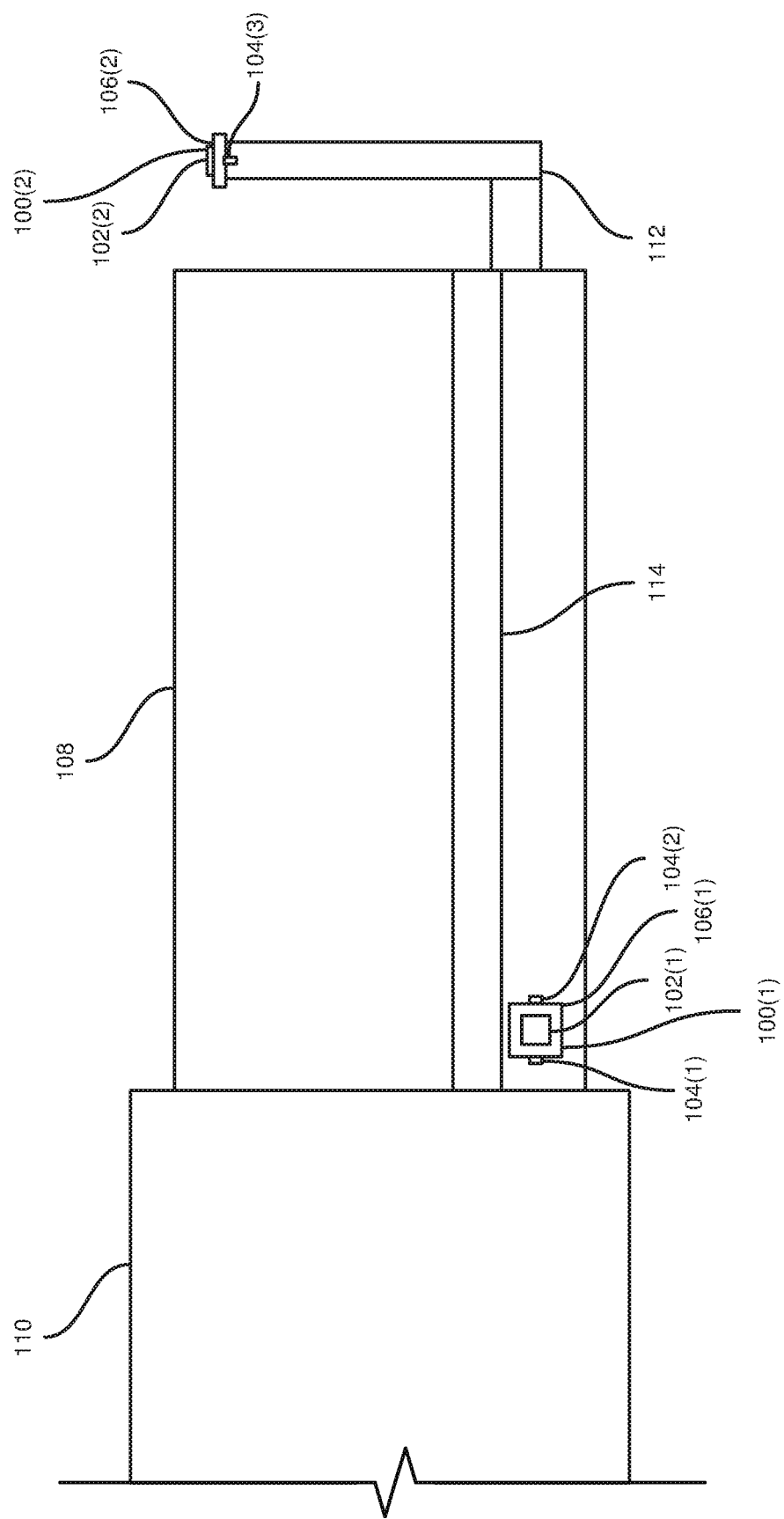
FIG. 1 is a side view of a hard-drive drawer that incorporates multiple exemplary shock-sensor apparatuses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for preventing shock-induced hard drive damage. As will be explained in greater detail below, embodiments of the instant disclosure may, using sensors mounted in various locations of a hard-drive rack, detect potential shock events prior to their occurrence and then send signals to hard drives within the rack to mitigate the impact of the same. For example, a shock-sensor apparatus mounted to the back of a hard-drive drawer may detect and calculate the distance to and amount of time before the drawer is fully closed (which may, upon occurrence, shock one or more hard drives within the drawer). In response, a computing module may then signal one or more hard drives within the drawer to take various mitigating actions to prevent damage from the same. Additionally, the disclosed embodiments may detect when the shock event has ended so that normal hard drive operations may resume.

The following will provide, with reference to FIG. 1, detailed descriptions of a hard-drive drawer that incorporates multiple exemplary shock-sensor apparatuses. In addition, the discussion associated with FIG. 2 will provide examples of hard-drive racks that utilize shock-sensor apparatuses. The discussion associated with FIG. 3 will provide detailed examples of hard drives protected from shock by the embodiments disclosed herein. Furthermore, detailed descriptions of computer-implemented methods for preventing shock-induced hard drive damage will be provided in connection with FIGS. 4-5.

FIG. 1 illustrates a side view of a hard-drive drawer 108 and shock-sensor apparatuses 100(1) and 100(2). Shock-sensor apparatuses 100(1) and 100(2) may each include a sensor, such as sensors 102(1) and 102(2), configured to detect a positional state of hard-drive drawer 108. In some embodiments, sensors 102(1) and 102(2) may be configured to detect a relative location of hard-drive drawer 108 and/or a relative velocity of hard-drive drawer 108. For example, sensor 102(1) may represent an optical sensor configured to detect a degree of extension of hard-drive drawer 108 and/or an accelerometer configured to detect a velocity of hard-drive drawer 108. Sensor 102(2) may represent a mechanical sensor configured to detect an attempt to open hard-drive drawer 108.

Shock-sensor apparatuses 100(1) and 100(2) of FIG. 1 may also each include a mounting component or multiple mounting components, such as mounting components 104(1)-(3) coupled to sensors 102(1) and 102(2), that are configured to mount sensors 102(1) and 102(2) in locations to monitor the positional state of hard-drive drawer 108. Mounting components 104(1)-(3) may represent any form of mechanical apparatus or adhesive material that may securely mount shock-sensor apparatuses 100(1) and 100(2). In some examples, mounting components 104(1)-(3) may mount sensors 102(1) and 102(2) to a side of hard-drive drawer 108, a handle of hard-drive drawer 108 (e.g., integrated within a depressible button within the handle that releases hard-drive drawer 108), an extension rail of hard-drive drawer 108, a chassis dimensioned to hold hard-drive drawer 108, a printed circuit board in hard-drive drawer 108, a hard drive in hard-drive drawer 108 itself, and/or any other suitable location. For example, as illustrated in FIG. 1, mounting components 104(1) and 104(2) may mount sensor 102(1) to the side of hard-drive drawer 108 to detect the movement of hard-drive drawer 108, such as detecting when hard-drive drawer 108 may close. Mounting component 104(3) may mount sensor 102(2) to a handle 112 of hard-drive drawer 108 to detect when an administrator attempts to open hard-drive drawer 108.

Additionally, shock-sensor apparatuses 100(1) and 100(2) may each include a computing module, such as computing modules 106(1) and 106(2) electronically coupled to sensors 102(1) and 102(2), that analyzes sensor data provided by sensors 102(1) and 102(2) to predict a shock event of hard-drive drawer 108 and to send, in response to predicting the shock event, a signal to one or more hard drives in hard-drive drawer 108 to prevent damage to the hard drive. As used herein, the term "computing module" generally refers to any type of application or computing device capable of executing computer-readable instructions. The term "shock event," as used herein, generally refers to an impact or a sudden change in velocity that disturbs computing hardware. The term "hard drive," as used herein, generally refers to a hardware medium that stores and/or processes data, typically using magnetic storage methods.

In some embodiments, computing modules 106(1) and 106(2) may be configured to predict the shock event of hard-drive drawer 108 based on the sensor data on the positional state of hard-drive drawer 108. Furthermore, computing modules 106(1) and 106(2) may be electronically coupled one or more hard drives in hard-drive drawer 108 such that computing modules 106(1) and 106(2) send the signal to the hard drive.

In one embodiment, hard-drive drawer 108 may be dimensioned to extend from the chassis on one or more extension rails. In the example of FIG. 1, hard-drive drawer 108 may extend from a chassis 110 on an extension rail 114. In this example, extension rail 114 may facilitate hard-drive drawer 108 to more easily slide into and out of chassis 110.

Figure 2:
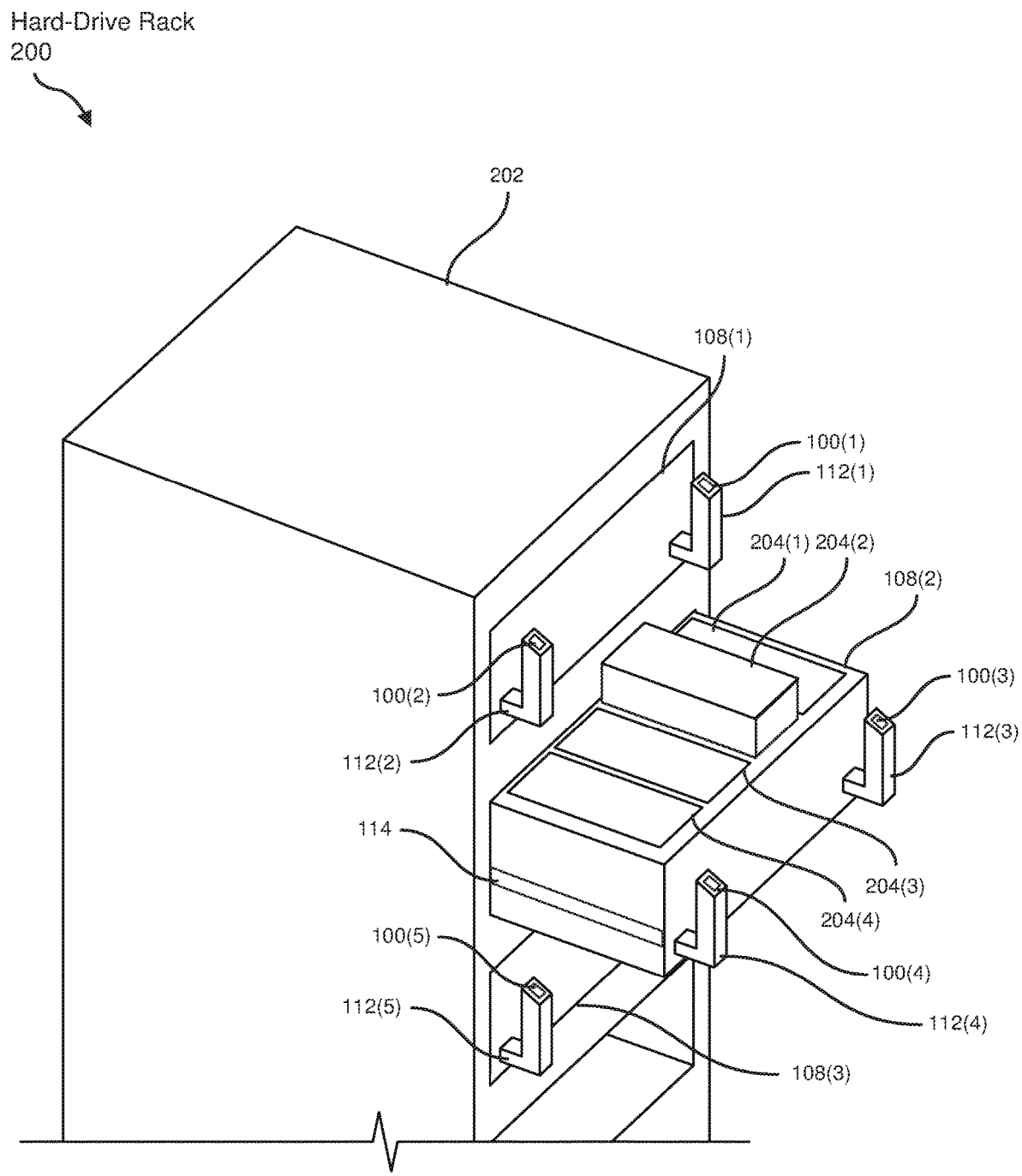
FIG. 2 is a perspective view of an exemplary hard-drive rack.

FIG. 2 illustrates a perspective view of a hard-drive rack 200 that may include a rack 202 dimensioned to hold computing hardware. As used herein, the term "rack" generally refers to a physical framework designed to house electronic and/or computing equipment, such as in a networked data center or server farm. Hard-drive rack 200 may also include one or more chassis coupled to rack 202 and dimensioned to hold hard-drive drawers 108(1)-(3). Additionally, hard-drive rack 200 may include one or more hard drives dimensioned to removably fit in each of hard-drive drawers 108(1)-(3). For example, hard-drive rack 200 may include hard drives 204(1)-(4) that may vertically slide into hard-drive drawer 108(2). In the example of FIG. 2, hard drives 204(1)-(4) may be removably installed in hard-drive drawer 108(2) such that opening hard-drive drawer 108(2) exposes hard drives 204(1)-(4). In this example, hard-drive drawer 108(2) may extend from rack 202 on extension rail 114. In alternative examples, a hard drive may be removably installed in a hard-drive drawer such that the hard drive is loaded to a front of the hard-drive drawer. In these examples, the hard-drive drawers may not be extendable or may generally remain stationary.

Furthermore, hard-drive rack 200 may include shock-sensor apparatuses 100(1)-(5) configured to detect positional states of hard-drive drawers 108(1)-(3), predict shock events of hard-drive drawers 108(1)-(3) based on an analysis of the positional states, and send signals to hard drives, such as hard drives 204(1)-(4) in hard-drive drawer 108(2), to prevent damage to the hard drives. For example, shock-sensor apparatuses 100(3) and 100(4) on handles 112(3) and 112(4) may detect the opening of hard-drive drawer 108(2) and predict a shock event due to the process of opening hard-drive drawer 108(2). Shock-sensor apparatuses 100(3) and 100(4) may then send signals to hard drives 204(1)-(4) to prevent damage caused by the opening of hard-drive drawer 108(2).

Figure 3:
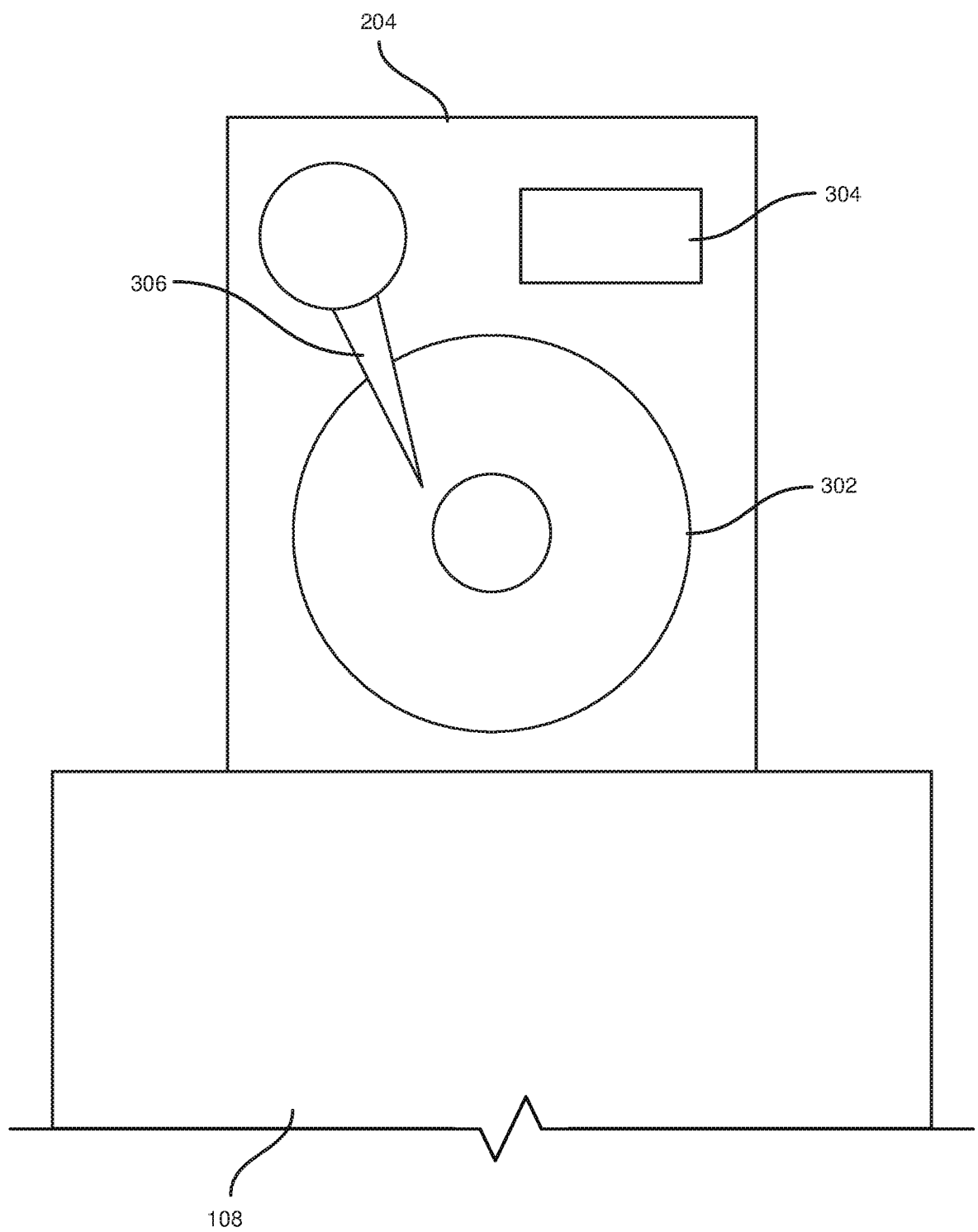
FIG. 3 is a detailed view of an exemplary hard drive protruding from a hard-drive drawer.

FIG. 3 illustrates a detailed view of a hard drive 204 protruding from hard-drive drawer 108. In some embodiments, hard drive 204 may include a hard-drive disk 302 configured to store digital data. In these embodiments, hard drive 204 may further include a non-volatile memory cache 304 configured to store additional digital data. Furthermore, in the example of FIG. 3, hard drive 204 may be coupled to a read/write head 306 that performs read/write operations on hard drive 204 with a heating element.

In one embodiment, a shock-sensor apparatus, such as shock-sensor apparatuses 100(3) and 100(4), may be electronically coupled to hard drive 204 such that shock-sensor apparatuses 100(3) and 100(4) send signals to adjust a behavior of read/write head 306. For example, shock-sensor apparatuses 100(3) and 100(4) may use an unused pin on a drive connector of hard drive 204 to electronically connect to hard drive 204.

Figure 4:
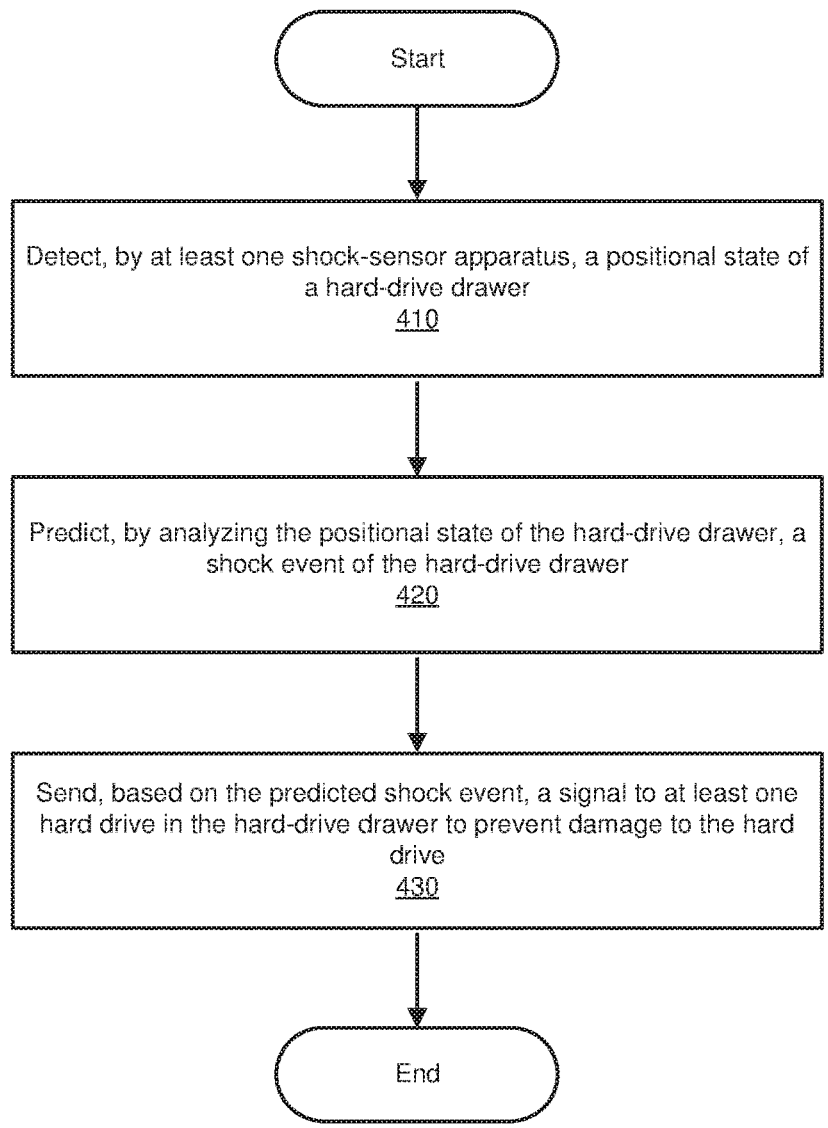
FIG. 4 is a flow diagram of an exemplary method for preventing shock-induced hard drive damage.

FIG. 4 shows a flow diagram of an exemplary computer-implemented method 400 for preventing shock-induced hard drive damage. The steps shown in FIG. 4 may be performed by any suitable computer-executable code and/or computing system, including the system illustrated in FIG. 5. In one example, each of the steps shown in FIG. 4 may represent an algorithm whose structure includes and/or is represented by multiple sub-steps, examples of which will be provided in greater detail below.

Figure 5:
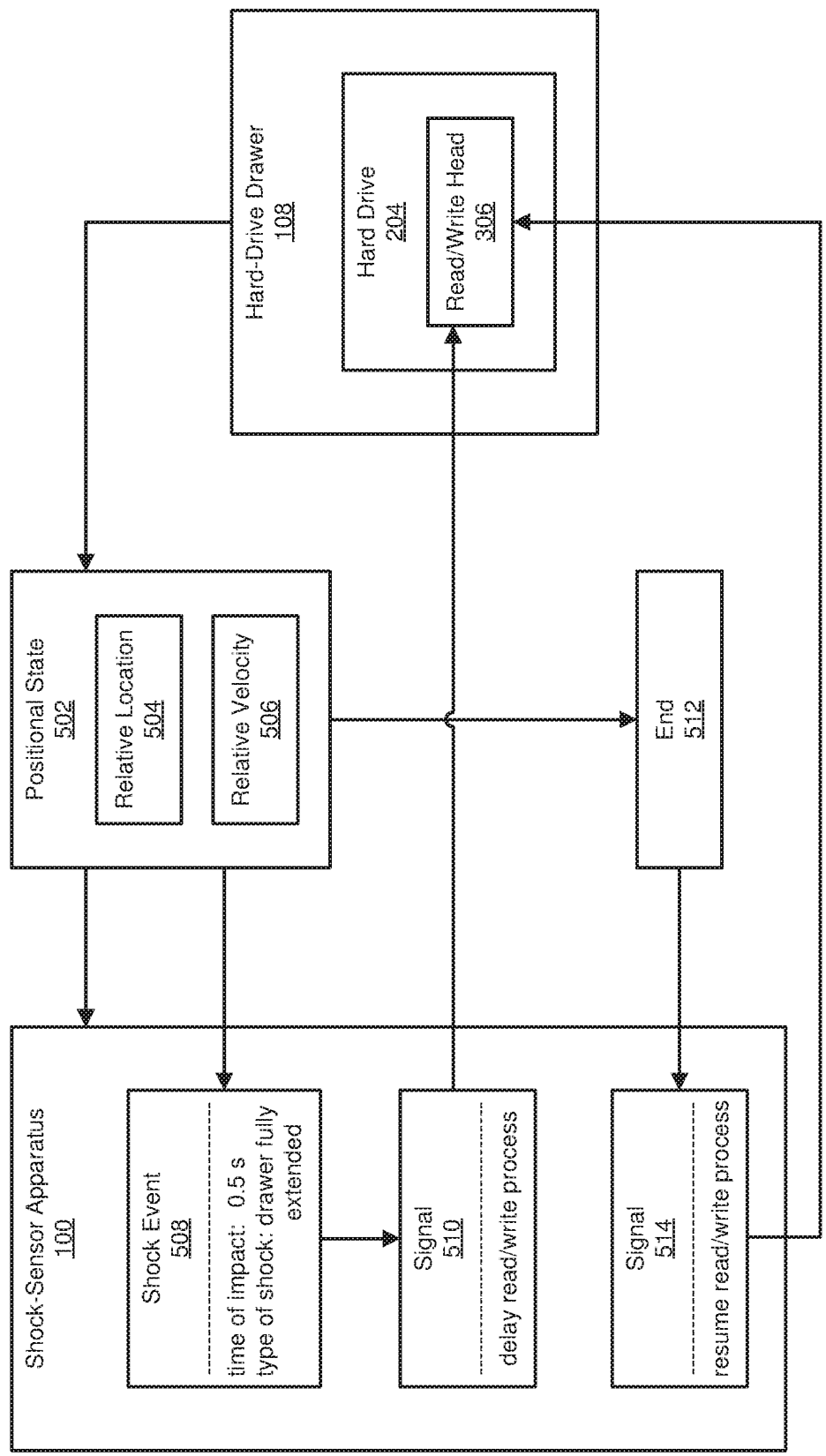
FIG. 5 is a block diagram of an exemplary system for preventing shock-induced hard drive damage.

As illustrated in FIG. 4, at step 410, one or more of the systems described herein may detect, by at least one shock-sensor apparatus, a positional state of a hard-drive drawer. For example, FIG. 5 is a block diagram of an exemplary system for preventing shock-induced hard drive damage. As illustrated in FIG. 5, a shock-sensor apparatus 100 may detect a positional state 502 of hard-drive drawer 108.

The systems described herein may perform step 410 of FIG. 4 in a variety of ways. In some embodiments, shock-sensor apparatus 100 may include a sensor configured to detect positional state 502, a mounting component configured to mount the sensor, and a computing module that analyzes sensor data including positional state 502. In the example of FIG. 5, positional state 502 may include a relative location 504 of hard-drive drawer 108, and a relative velocity 506 of hard-drive drawer 108. Each sensor of each shock-sensor apparatus may analyze the surroundings of the specific location of each sensor to detect multiple positional states. Alternatively, positional state 502 may represent the combined sensor data received from multiple shock-sensor apparatuses to create a holistic view of hard-drive drawer. For example, positional state 502 may include relative velocity 506 detected by sensor 102(1) of FIG. 1 and relative position 504 detected by sensor 102(2).

Returning to FIG. 4, at step 420, one or more of the systems described herein may predict, by analyzing the positional state of the hard-drive drawer, a shock event of the hard-drive drawer. For example, shock-sensor apparatus 100 in FIG. 5 may analyze positional state 502 to predict a shock event 508.

The systems described herein may perform step 420 of FIG. 4 in a variety of ways. In some examples, predicting shock event 508 may include predicting a time of impact of hard-drive drawer 108, an amount of shock caused by an impact to hard-drive drawer 108, and/or a type of shock event 508. In the example of FIG. 5, predicted shock event 508 may include a predicted time of impact (e.g., in 0.5 seconds) and an expected type of shock (e.g., shock due to fully extending hard-drive drawer 108). For example, shock-sensor apparatus 100(1) of FIG. 1 may detect hard-drive drawer 108 has extended far enough from chassis 110 that shock event 508 is imminent due to a sudden stop as hard-drive drawer 108 reaches the full extension of extension rail 114. As another example, shock-sensor apparatus 100 of FIG. 5 may predict an expected amount of shock based on an expected force, where force equals mass multiplied by acceleration, exerted on hard-drive drawer 108 by shock event 508.

Returning to FIG. 4, at step 430, one or more of the systems described herein may send, based on the predicted shock event, a signal to at least one hard drive in the hard-drive drawer to prevent damage to the hard drive. For example, shock-sensor apparatus 100 in FIG. 5 may send, based on shock event 508, a signal 510 to hard drive 204 stored in hard-drive drawer 108 to prevent damage to hard drive 204.

The systems described herein may perform step 430 of FIG. 4 in a variety of ways. In one embodiment, sending signal 510 may include sending signal 510 within a minimum timeframe before the time of impact of shock event 508. For example, shock-sensor apparatus 100 may send signal 510 at most 0.3 seconds after predicting shock event 508 to provide a minimum of 0.2 seconds for hard drive 204 to prepare for shock event 508.

In some examples, sending signal 510 to hard drive 204 may include sending signal 510 to read/write head 306 of hard drive 204. In these examples, signal 510 may include a command to delay a read/write process during shock event 508, prevent the read/write process during shock event 508, adjust a distance of read/write head 306 from hard drive 204, temporarily write data to a non-volatile memory cache (e.g., non-volatile memory cache 304 of FIG. 3), park read/write head 306 during shock event 508, and/or turn off the heating element of read/write head 306 during shock event 508. For example, read/write head 306 may only perform read functions and not write functions during shock event 508 to prevent corrupting data. Alternatively, read/write head 306 may physically move closer to hard-drive disk 302 of hard drive 204 for write operations. As another example, read/write head 306 may park at a ramp or at a non-crucial section of hard-drive disk 302 during shock event 508 to avoid physically damaging hard-drive disk 302.

In some embodiments, method 400 may further include detecting an end of the shock event, sending an additional signal to the hard drive in the hard-drive drawer, and/or resuming a normal read/write operation on the hard drive. As illustrated in FIG. 2, shock-sensor apparatus 100 may detect an end 512 of shock event 508 and, subsequently, may send an additional signal 514 to read/write head 306 of hard drive 204 to resume a read/write process. For example, read/write head 306 of FIG. 3 may temporarily write data to non-volatile memory cache 304 during shock event 508 and may then transfer the data to hard-drive disk 302 after shock event 508 ends.

As discussed throughout the instant disclosure, the disclosed methods, systems, and apparatuses may provide one or more advantages over traditional methods of protecting hard drives from shock. For example, various shock-sensor apparatuses described herein may predict different types of shock events based on the position and velocity of hard drives and/or hard-drive drawers, and these apparatuses may be incorporated into different types of hard-drive storage systems. By predicting shock events before they happen, the methods, systems, and apparatuses described herein may prepare hard drives to withstand the shock. For example, by sending a warning signal to a read/write head in advance of a predicted shock event, the methods, systems, and apparatuses described herein may prevent damage to both the read/write head and a hard-drive disk by giving the read/write head enough time to physically adjust or revise a read/write process to minimize the risk of damage to the hard-drive disk. Furthermore, by writing to a non-volatile memory cache rather than the hard-drive disk, the disclosed methods, systems, and apparatuses may permit the hard drive to continue to accept data without damaging the hard-drive disk during the shock event. Thus, the methods, systems, and apparatuses described herein may improve the prediction and response to unexpected hard-drive shock.

As detailed above, the computing devices and systems described and/or illustrated herein broadly represent any type or form of computing device or system capable of executing computer-readable instructions, such as those contained within the computing modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the computing modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more computing modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A shock-sensor apparatus comprising:
   a sensor configured to detect a positional state of a hard-drive drawer relative to a chassis dimensioned to hold the hard-drive drawer;
   a mounting component coupled to the sensor and configured to mount the sensor in a location to monitor the positional state of the hard-drive drawer relative to the chassis; and
   a computing module, electronically coupled to the sensor, that analyzes sensor data provided by the sensor to:
      predict a shock event of the hard-drive drawer during operation of at least one hard drive in the hard-drive drawer as the hard-drive drawer is opened or closed; and
      send, in response to predicting the shock event, a signal to the at least one hard drive in the hard-drive drawer to prevent damage to the at least one hard drive during the predicted shock event.

2. The shock-sensor apparatus of claim 1, wherein the sensor is configured to detect at least one of:
   a relative location of the hard-drive drawer; or
   a relative velocity of the hard-drive drawer.

3. The shock-sensor apparatus of claim 2, wherein the computing module is configured to predict the shock event of the hard-drive drawer based on the relative location of the hard-drive drawer and the relative velocity of the hard-drive drawer indicated by the sensor data.

4. The shock-sensor apparatus of claim 2, wherein the computing module is configured to predict a time during which the shock event of the hard-drive drawer will occur based on the relative location of the hard-drive drawer and the relative velocity of the hard-drive drawer indicated by the sensor data.

5. The shock-sensor apparatus of claim 1, wherein the mounting component mounts the sensor to at least one of:
   a side of the hard-drive drawer;
   a handle of the hard-drive drawer;
   an extension rail of the hard-drive drawer;
   the chassis;
   a printed circuit board in the hard-drive drawer; or
   the at least one hard drive in the hard-drive drawer.

6. The shock-sensor apparatus of claim 1, wherein the computing module is electronically coupled to the at least one hard drive in the hard-drive drawer such that the computing module sends the signal to the at least one hard drive.

7. A hard-drive rack comprising:
   a rack dimensioned to hold computing hardware;
   a chassis coupled to the rack and dimensioned to hold a hard-drive drawer;
   at least one hard drive dimensioned to removably fit in the hard-drive drawer; and
   at least one sensor apparatus configured to:
      detect a positional state of the hard-drive drawer relative to the chassis;
      predict a shock event of the hard-drive drawer during operation of the at least one hard drive in the hard-drive drawer as the hard-drive drawer is opened or closed; and
      send, in response to predicting the shock event, a signal to the at least one hard drive in the hard-drive drawer to prevent damage to the at least one hard drive during the predicted shock event.

8. The hard-drive rack of claim 7, wherein the hard-drive drawer is dimensioned to extend from the chassis on at least one extension rail.

9. The hard-drive rack of claim 7, wherein the at least one hard drive comprises:
   a hard-drive disk configured to store digital data; and
   a non-volatile memory cache configured to store additional digital data.

10. The hard-drive rack of claim 7, wherein the at least one hard drive is removably installed in the hard-drive drawer such that:
    opening the hard-drive drawer exposes the at least one hard drive; or
    the at least one hard drive is loaded to a front of the hard-drive drawer.

11. The hard-drive rack of claim 7, wherein the at least one hard drive is coupled to a read/write head that performs read/write operations on the at least one hard drive with a heating element.

12. The hard-drive rack of claim 11, wherein the sensor apparatus is electronically coupled to the at least one hard drive such that the sensor apparatus sends the signal to adjust a behavior of the read/write head.

13. The hard-drive rack of claim 7, wherein the sensor apparatus is mounted to at least one of:
    a side of the hard-drive drawer;
    a handle of the hard-drive drawer;
    an extension rail of the hard-drive drawer;
    the chassis;
    a printed circuit board in the hard-drive drawer; or
    the at least one hard drive in the hard-drive drawer.

14. A method comprising:
    detecting, by at least one sensor apparatus, a positional state of a hard-drive drawer relative to a chassis dimensioned to hold the hard-drive drawer;
    predicting a shock event of the hard-drive drawer during operation of the at least one hard drive in the hard-drive drawer as the hard-drive drawer is opened or closed; and
    sending, based on the predicted shock event, a signal to the at least one hard drive in the hard-drive drawer to prevent damage to the at least one hard drive during the predicted shock event.

15. The method of claim 14, wherein the at least one sensor apparatus comprises:
    a sensor configured to detect the positional state of the hard-drive drawer;
    a mounting component coupled to the sensor and configured to mount the sensor to monitor the positional state of the hard-drive drawer; and
    a computing module, electronically coupled to the sensor, that analyzes sensor data provided by the sensor.

16. The method of claim 14, wherein predicting the shock event of the hard-drive drawer comprises predicting at least one of:
    a time of impact of the hard-drive drawer;
    an amount of shock caused by an impact to the hard-drive drawer; or
    a type of the shock event.

17. The method of claim 16, wherein sending the signal to the hard drive comprises sending the signal within a minimum timeframe before the time of impact of the predicted shock event.

18. The method of claim 14, wherein sending the signal to the hard drive comprises sending the signal to a read/write head that performs read/write operations on the hard drive with a heating element.

19. The method of claim 18, wherein the signal comprises a command to perform at least one of:
   delaying a read/write process during the shock event;
   preventing the read/write process during the shock event;
   adjusting a distance of the read/write head from the hard drive;
   temporarily writing data to a non-volatile memory cache;
   parking the read/write head during the shock event; or
   turning off the heating element of the read/write head during the shock event.

20. The method of claim 14, further comprising at least one of:
   detecting an end of the shock event;
   sending an additional signal to the hard drive in the hard-drive drawer; or
   resuming a normal read/write operation on the hard drive.

* * * * *